Patented Nov. 28, 1939

2,181,791

UNITED STATES PATENT OFFICE 2,181,791

PROCESS FOR PURIFYING WOOD ROSIN

Robert E. Price, Picayune, Miss., assignor to Crosby Naval Stores, Incorporated, Picayune, Miss., a corporation of Mississippi No Drawing. Application December 15, 1938, Serial No. 245,985

10 Claims. (Cl. 260—107)

My invention relates to an improved process for purifying low grade wood rosin which has been extracted, by means of solvents or otherwise, from dead timber, waste wood, stumps, etc. More particularly, my invention provides for an improved process for producing purified or partially decolorized wood rosin having certain desirable characteristics, particularly a relatively high positive optical rotation.

As is well known to those skilled in the art the marketability and value of wood rosin is dependent almost entirely upon the purity thereof. Wood rosin is sold to the trade in various grades depending upon color, clarity and transparency. These grades are designated B, D, E, F, G, H, I, K, M, N, WG, WW, and X, B grade being the darkest and X the palest in color. For some uses in the art it is imperative that the rosin be of a superior grade (containing a minimum amount of coloring bodies), particularly where the rosin is to be utilized in the manufacture of soaps, in sizing for white paper and in pale varnishes.

It is, therefore, a prime object of my invention to improve the color, clarity and transparency of wood rosin by the removal therefrom of coloring bodies through the medium of a simple, inexpensive process employing a minimum of apparatus and labor.

Heretofore in this art, many processes have been suggested and employed for the purification and decolorization of wood rosin. Among the more important of these may be mentioned distillation in vacuo, selective solvent processes and precipitation processes wherein the color bodies are precipitated by means of anhydrous metal chlorides. While unquestionably these prior art processes are to some extent practical and successful, the practice thereof entails meticulous control and a great deal of expense.

By far the simplest and least expensive prior art purification processes employ the contact filtration principle whereby the impurities are removed by simple contact with some adsorbent medium, such as fuller's earth, bentonite (either natural or acid treated) or other adsorbent clay. One distinct disadvantage however of contact processes employing adsorbent clays such as fuller's earth is the extreme susceptibility of the clays to disintegrate in the presence of water, or solvents containing water, to form a highly objectionable mud or slime. In cases where the adsorbent material is used in percolation towers, special precaution must be taken to prevent access of moisture, because the formulation of mud or slime in such towers makes them completely inoperative. Thus, in the use of fuller's earth as an absorbent for the purification of wood rosin, the removal of moisture is an essential step in rendering the process commercially operative. The efficacy of fuller's earth is greatly decreased by the presence of moisture, in addition to the danger of disintegration and slime formation. Acid-treated bentonite, as disclosed in copending application Serial No. 174,128, is much more efficient than fuller's earth as an adsorbent for wood rosin color bodies but it is likewise susceptible to the disintegrating action of water.

Another disadvantage attending the use of fuller's earth, bentonite and other adsorbent clays is the tendency of these substances to isomerize rosin acids (which normally have a positive rotation) to rosin acids having a negative rotation. Strongly laevo-rotatory rosin has a very strong tendency to crystallize, either from itself or from solution, and this constitutes a serious objection to its industrial utilization.

Now, I have discovered that the foregoing, and other inherent disadvantages of ordinary adsorbent clays in contact purification of wood rosin are definitely obviated by contacting wood rosin solutions with an active, adsorptive magnesium silicate, which may be either of natural or synthetic origin. There is found naturally occurring in this country, particularly in the Western States, a magnesium silicate which, after being freed from a greater part of clay impurities, has approximately the following analysis:

|  | Per cent |
|---|---|
| Silica ($SiO_2$) | 60 to 65 |
| Magnesia (MgO) | 27 to 32 |
| Water (combined) | 4 to 12 | and corresponds to the formula for the mineral sepiolite or meerschaum: $3SiO_2.2MgO.2H_2O$.

This material is white to gray in color, light and porous, and is distinguished by the fact that it does not swell or gelatinize on standing in water. In fact, when agitated in water it does not form a mud or slime, but subsides rapidly, leaving the water clear. This property of resistance to the action of water persists even in impure samples containing up to 40% of hydrous aluminum silicates (clays).

Synthetic magnesium silicates, analytically approximating the above formula, have likewise been found useful in the practice of the present invention. While my improved process is in no way limited to any particular synthesis, silicates of the foregoing approximate formula may be prepared by the interreaction of a calcium compound, such as calcium carbonate or calcium hydroxide, with finely divided silica and a water soluble magnesium salt of a strong acid, such as hydrochloric acid. Proportions of the reactants may be varied to produce different relative proportions of MgO and SiO₂ in the final product.

Wood rosin purified by contacting solutions thereof in hydrocarbon solvents with a magnesium silicate of the foregoing character may be recovered in good yield, and is noted particularly for its high positive optical rotation. Such purified rosin shows relatively little tendency to crystallize either from itself or from solution, and is therefore highly suitable for many industrial uses.

Prior workers have attempted the purification of ordinary rosin (colophony) by contacting the rosin, in a molten condition and at a temperature far above its melting point to insure complete fluidity, with a naturally occurring magnesium silicate. Such a process when applied to the purification of wood rosin, however, is singularly inoperative. Heating molten wood rosin for any length of time will and does cause isomerization and a pronounced decrease in specific optical rotation. Furthermore, aside from insurmountable practical difficulties met with in the process, the decolorizing effect of magnesium silicate on molten wood rosin is very slight, in fact quite insignificant for commercial use. Just why magnesium silicates are so efficient in the purification of wood rosin solutions, and inoperative to purify ordinary molten colophony, may be due, in no little measure, to the differences in color bodies found in the two types of rosin. Very little is understood concerning adsorption phenomena and much seems to depend upon the type and constitution of the color bodies to be adsorbed. The impurities in wood rosin are of a very peculiar and complex nature, some being of unknown chemical constitution. It may be stated that these coloring bodies are of such a character that comparison of the same with obnoxious coloring bodies found in other natural resins and gums, even in colophony, cannot be made in any way.

The advantages offered by magnesium silicate of the types referred to over other adsorption agents are clearly illustrated by experimental data outlined in the table below. All of the experiments were made using a stock solution of FF wood rosin in petroleum naphtha, the concentration of which was 20 grams of rosin per 100 grams of solution. The specific optical rotation of the original FF wood rosin was +17. The ratio of adsorbent to rosin was 2:1, the time of contact one hour and the temperature of contact 28° C.

| Adsorbent | Grade | Specific rotation |
| --- | --- | --- |
| Fuller's earth | N | 0.0 |
| Acid-treated bentonite | N | −5.2 |
| Naturally occurring magnesium silicate | N | +14.8 |

In another comparison, the ratio of adsorbent to rosin was increased to 4:1 for one hour at 28° C. Treatment with acid-treated bentonite yielded "X" grade rosin with a rotation of −25.6, whereas treatment with the magnesium silicate yielded "X" grade rosin having a rotation of +16.5. This shows conclusively that magnesium silicates have practically no effect on the optical rotation of the rosin.

In a pilot-plant operation, several barrels of FF wood rosin of original optical rotation of +17 were dissolved in petroleum naphtha in weight proportion corresponding approximately to one part of rosin to 5 parts of solution, one portion of the solution being passed slowly through a tower packed with acid-treated bentonite, the remaining portion being passed through a tower packed with naturally occurring magnesium silicate. The acid-treated bentonite yielded "M" rosin having a rotation of −3.0 whereas the magnesium silicate, under the same conditions of operation, yielded "M" rosin with a rotation of +16.1. In this pilot-plant operation, employing these two adsorption media, a considerable practical difference was noted in the resistance to water during revivification. Treated with a revivifying agent consisting of 93-95% ethyl alcohol, the acid-treated bentonite disintegrated and formed "fines" which plugged the towers so that the rosin-naphtha solution could not be pumped through them after the third revivification. Under the same conditions, the magnesium silicate showed no disintegration. Even after twenty revivifications there was no increase in the pressure required to force the rosin solution through the towers.

As pointed out, my process consists broadly in purifying wood rosin by dissolving the rosin in a suitable hydrocarbon solvent, such as petroleum naphtha, and then contacting this solution with a magnesium silicate. If finely ground magnesium silicate is used, it may be added to the solution of rosin in naphtha, agitated by suitable mechanical means, and then filtered. It is convenient to pack the coarser grades of magnesium silicate in towers and percolate the rosin-naphtha solution through the towers. In either case, the color bodies and/or other impurities are adsorbed by the magnesium silicate and the purified rosin is recovered from the filtrate by evaporating the naphtha in suitable evaporators, or stills.

In my preferred procedure, magnesium silicate which has been screened to pass through a 16 mesh sieve but not through a 40 mesh sieve, is placed in towers having suitable pipe connections at top and bottom. A solution of FF wood rosin in petroleum naphtha having a concentration of 20% by weight, is then pumped through three or more towers in series until samples of the filtrate show that purified rosin of the desired grade is no longer coming through. The valves are then changed so that the first tower is removed from the pumping cycle and a tower of fresh adsorbent is picked up in the cycle. During this second pumping period, the tower which has been cut out is revivified by first flooding with naphtha to displace the rosin-naphtha solution, and then flooding with a suitable solvent for the color bodies (which have been adsorbed on the magnesium silicate). For this purpose methyl, ethyl, propyl, or butyl alcohol, or acetone or other solvents may be used, my preferred solvent being ethyl alcohol. The solvent can be used at ordinary room temperature but it is preferable to preheat it to say 50-70° C. After a short period of "soaking" to allow complete solution of the color bodies and/or other impurities, the solution in the tower is displaced by pumping through 2 or 3 volumes of petroleum naphtha. The naphtha is preferably preheated to from 70° to 110° C. to insure complete removal of the color body revivification solvent from the adsorbent. The revivified tower is now ready to be put back in the pumping cycle.

In order to make the process continuous my preferred procedure is to employ four towers. Preferably, rosin solution is pumped through three towers at all times while the fourth tower is being revivified. The pumping schedule may be outlined as follows, designating the four towers by the letters A, B, C, and D:

A→B→C
   B→C→D
   C→D→A
   D→A→B
   A→B→C etc.

It is to be understood that the tower which is not in the pumping cycle is being revivified.

Other cycles may, of course, be used. Under some conditions it may be advantageous to pump through 4 or 5 towers in series, and/or to lengthen the time for revivification by having two or more towers undergoing revivification. The foregoing cycles are for the purpose of illustration only and it is to be understood that the successful operation of my process is not in any sense limited to this particular arrangement of towers in the pumping cycle.

I claim:

1. A process for purifying wood rosin which comprises dissolving said wood rosin in a solvent therefor, contacting the resultant solution with a magnesium silicate having a molecular ratio of $MgO:SiO_2$ between 1:1.25 and 1:1.60, separating the solution from the magnesium silicate, recovering the purified rosin from said solution by distillation, washing said magnesium silicate after said separation, first with petroleum naphtha, then with alcohol, finally with the rosin solvent, and then again contacting said washed magnesium silicate with a further solution of impure rosin.

2. A process for purifying wood rosin which comprises dissolving said wood rosin in petroleum naphtha, passing said solution through a bed of a magnesium silicate having a molecular ratio of $MgO:SiO_2$ between 1:1.25 and 1:1.60, recovering the purified rosin from the solution by distillation, washing the bed of magnesium silicate, first with a rosin solvent, then with a solvent for coloring bodies, finally with the rosin solvent, and then again contacting said bed of washed magnesium silicate with a further solution of impure rosin.

3. A process for purifying wood rosin which comprises dissolving said wood rosin in a solvent therefor, contacting the resultant solution with a magnesium silicate having a molecular ratio of $MgO:SiO_2$ between 1:1.25 and 1:1.60, and recovering the purified rosin from the treated solution.

4. A process for purifying wood rosin which comprises dissolving said wood rosin in a solvent therefor, contacting the resultant solution with a magnesium silicate corresponding approximately to the empirical formula $3SiO_2.2MgO.2H_2O$, and recovering the purified rosin from the treated solution.

5. A process for purifying wood rosin which comprises dissolving said wood rosin in a solvent therefor, passing the resultant solution through a bed of magnesium silicate having a molecular ratio of $MgO:SiO_2$ between 1:1.25 and 1:1.60, collecting the purified rosin solution and recovering the rosin from said purified solution.

6. A process for purifying wood rosin which comprises dissolving said wood rosin in a solvent therefor, passing the resultant solution through a bed of magnesium silicate corresponding approximately to the empirical formula $$3SiO_2.2MgO.2H_2O$$

collecting the purified rosin solution and recovering the rosin from the purified solution.

7. A process for purifying wood rosin which comprises dissolving said wood rosin in petroleum naphtha, passing the resultant solution through a bed of magnesium silicate having a molecular ratio of $MgO:SiO_2$ between 1:1.25 and 1:1.60, collecting the purified rosin solution, recovering the rosin from said purified solution, revivifying the magnesium silicate by dissolving therefrom rosin and color bodies and again contacting the revivified magnesium silicate with a further solution of impure rosin.

8. A process for purifying wood rosin which comprises dissolving said wood rosin in petroleum naphtha, passing the resultant solution through a bed of magnesium silicate corresponding approximately to the empirical formula $$3SiO_2.2MgO.2H_2O,$$

collecting the purified rosin solution, recovering the rosin from said purified solution, revivifying the magnesium silicate by dissolving therefrom rosin and color bodies and again contacting the revivified magnesium silicate with a further solution of impure rosin.

9. A process for purifying wood rosin which comprises dissolving said wood rosin in a solvent therefor, contacting the resultant solution with a magnesium silicate corresponding approximately to the empirical formula $3SiO_2.2MgO.2H_2O$, separating the solution from the magnesium silicate, recovering the purified rosin from said solution by distillation, washing said magnesium silicate after said separation, first with petroleum naphtha, then with alcohol, finally with the rosin solvent, and then again contacting said washed magnesium silicate with a further solution of impure rosin.

10. A process for purifying wood rosin which comprises dissolving said wood rosin in petroleum naphtha, passing said solution through a bed of magnesium silicate corresponding approximately to the empirical formula $3SiO_2.2MgO.2H_2O$, recovering the purified rosin from the solution by distillation, washing the bed of magnesium silicate, first with a rosin solvent, then with a solvent for coloring bodies, finally with the rosin solvent, and then again contacting said bed of washed magnesium silicate with a further solution of impure rosin.

ROBERT E. PRICE.